April 17, 1956  A. R. PARILLA  2,742,175
PRESSURE ACTUATED SEAL
Filed July 1, 1952

INVENTOR
ARTHUR R. PARILLA

BY
ATTORNEYS

United States Patent Office 2,742,175
Patented Apr. 17, 1956

2,742,175

PRESSURE ACTUATED SEAL

Arthur R. Parilla, Mountain Lakes, N. J., assignor, by mesne assignments, to the United States of America as represented by the Secretary of the Navy Application July 1, 1952, Serial No. 296,684

8 Claims. (Cl. 220—24.5)

This invention relates to a sealing mechanism and more particularly to a fluid pressure actuated seal.

The present invention proposes to provide a pressure actuated seal comprising a shield and a strip of readily deformable material cooperating with the sidewalls of a chamber to be sealed. The characteristics of the seal are such that its effective operation is not dependent on a smooth surface configuration of the chamber wall thereby providing a relatively inexpensive means for sealing off high pressure differential chambers of the type that are employed in rockets and other items of ordnance.

Accordingly it is an object of the present invention to provide a simple inexpensive sealing mechanism.

Another object is to provide a simple fluid pressure actuated seal.

Still another object is to provide an inexpensive fluid actuated seal whose operation is independent of the surface configuration of a chamber being closed.

Another object is to provide a simple fluid pressure actuated seal which may be readily affixed and whose operation is independent of the surface configuration of the chamber being closed or divided.

Other objects and many of the attendant advantages of this invention will be readily appreciated as the same becomes better understood by reference to the following detailed description when considered in connection with the accompanying drawing wherein.

Figure 1:
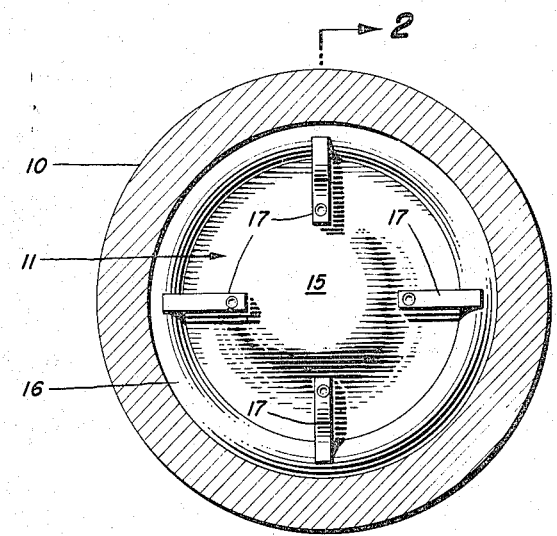
Fig. 1 is an elevated plan view of an end of a cylindrical chamber provided with the present invention.
Figure 2:
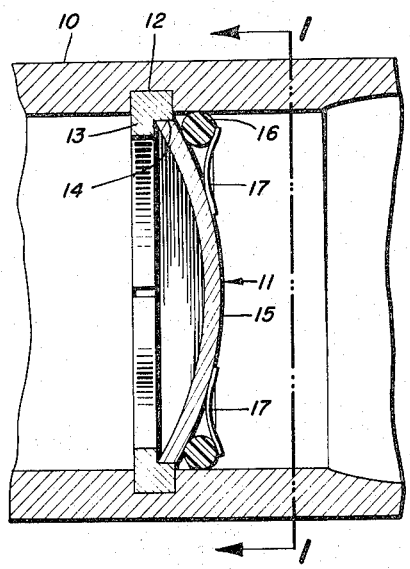
Fig. 2 is a sectional view of a portion of the chamber taken along a line substantially corresponding to line 2—2 of Fig. 1 and disclosing a split ring retainer for maintaining a concave-convex head closure in position.

Referring now to the drawing, wherein like reference numerals designate the same parts throughout the several views, there is disclosed a pressure vessel or casing 10, which is separated into two chambers by a pressure actuated seal assembly 11. The casing 10 is shown in the preferred embodiment to be of circular cross section, however, it may possess any well known cross sectional configuration and is further provided with an internal annular groove 12 for receiving an end closure retaining ring 13. The ring 13 may be of the split type for facilitating the seating thereof into the groove 12 and is preferably provided with a shoulder 14 extending around the inner periphery thereof for contacting and supporting a head closure or chamber separating member 15. The shield 15 is composed of a resilient material of high tensile strength and possesses a domelike configuration. The domelike or concave-convex shield 15 is responsive to pressures exerted against the convex surface and tends to flatten out, thereby creating a tighter fit between the shoulder 14 of the split ring and the peripheral edge of the shield 15.

It is apparent that because of the configuration of the shield 15 it will respond to pressures exerted against its convex surface to become more firmly seated on retaining ring 13 and that an increase of pressure will cause the contact between the shield and the shoulder 14 of the ring 13 to become more intimate. The aforementioned intimacy of contact may be such that if the peripheral edge of the shield and the shoulder 14 of the ring 13 are machined to very close tolerances, an effective fluid tight seal may be produced. However, the requirement of machining to close tolerances becomes prohibitive both in cost and in time required to perform the machining operations so as to limit the use of this type of structure to mechanisms wherein the relative cost of the structure is negligible.

In order to insre a fluid tight closure there is provided a sealing means 16 formed of a continuous strip of deformable material which will flow in response to fluid pressure to assume a surface configuration complementary with that of the surrounding contacting surfaces. The O-ring 16 is mounted in the apex of an acute angle formed by the shield 15 and the inner walls of the casing 10 and is maintained therein by ring retaining fingers 17. The ring retainers 17 are preferably secured on the convex surface of shield 15 in any well known manner, such as, for example, spot welding, and are composed of resilient material to hold the ring 16 in contact with the internal walls of the casing 10 and the shield. It is to be understood that other means may be resorted to in order to maintain the ring 16 in its initial position such as an annular ring mounted on the shield and in contact with the seal, or the use of an adhesive applied to the seal.

Figure 3:
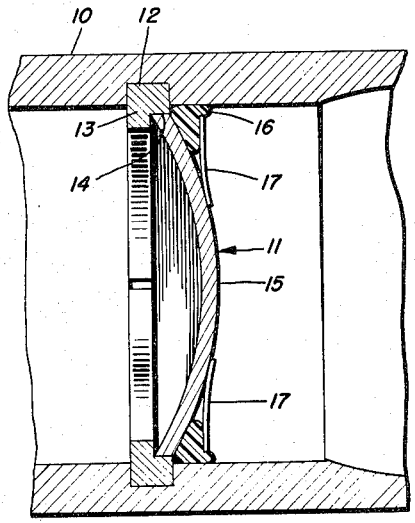
Fig. 3 is a changed position view similar to Fig. 2 disclosing the effect of pressure upon the deformable sealing ring.

As shown in Fig. 3 pressure causes the ring 16 to flow and become deformed and to assume a shape determined by the contacting surfaces of the casing 11 and the shield 15 thereby effecting a complete fluid tight separation of one portion of the casing from another.

Due to the ring member 16 it is readily apparent that if desired the machine tolerances of the various component parts of the separating mechanism 11 may be such that only a loose mechanical fit is required.

Obviously many modifications and variations of the present invention are possible in the light of the above teachings. It is therefore to be understood that within the scope of the appended claims the invention may be practiced otherwise than as specifically described.

What is claimed is:

1. A sealing means for a pressure vessel having an annular groove formed therein, a split-ring adapted to be seated in said groove, a radially expandable head closure member to be mounted on said split-ring and having a substantially domelike surface contour extending inwardly with relation to the vessel, a continuous strip of deformable material mounted within the vessel to bear upon the inwardly extending surface of the closure head and the vessel sidewall, and means mounted on the inwardly extending surface of said head for retaining the strip in said bearing relationship said strip being deformed by the pressure into the juncture between the inwardly extending surface of the closure and the vessel sidewall independently of the radial expansion of said closure member.

2. A pressure seal for a vessel having an annular groove formed therein, a split-ring adapted to be seated in said groove and having a shoulder formed on the inner periphery thereof, a radially expandable head closure to be mounted on said shoulder and having a substantially domelike surface contour extending inwardly with relation to the vessel, said head closure forming an acute angle with the walls of the vessel, a continuous strip of deformable material positioned in the apex of said angle to bear upon the inwardly extending surface of the closure head and the vessel sidewall, and means mounted on the inwardly extending surface of said head for maintaining the strip in said bearing relationship, the sealing action of the strip being independent of radial movement of the head closure.

3. A pressure seal for a vessel having an annular groove formed therein, a split-ring adapted to be seated in said groove and having a shoulder formed on the inner periphery thereof, a head closure to be mounted on said shoulder and having a substantially domelike surface contour extending inwardly with relation to the vessel, said head closure forming an acute angle with the walls of the vessel, an O-ring formed of deformable material positioned in the apex of said angle to bear upon the inwardly extending surface of the closure head and the vessel sidewall, and means mounted on the inwardly extending surface of said head for urging the O-ring into said bearing relationship.

4. A pressure seal for a vessel having an annular groove formed therein, a split-ring adapted to be seated in said groove and having a shoulder formed on the inner periphery thereof, a head closure to be mounted on said shoulder and having a substantially domelike surface contour extending inwardly with relation to the vessel, said head closure forming an acute angle with the walls of the vessel, an O-ring formed of deformable material positioned in the apex of said angle to bear upon the inwardly extending surface of the closure head and the vessel sidewall, and a plurality of resilient ring retainers mounted on the inwardly extending surface of said head for maintaining the O-ring in said bearing relationship.

5. A pressure seal for a vessel subject to internal pressure comprising, a dish shaped closure member having a radially expandable peripheral edge and arranged in the vessel so that the pressure engages the undished face of the closure member, radially expandable means in continuous contact with the peripheral edge of the closure member, the pressure urging said radially expandable means and the closure member radially outwardly toward a flattened condition whereby said means will be spread and forced outwardly against the inner walls of the vessel, a continuous sealing member mounted along the periphery of said closure member and urged against said closure member and inner wall independently of the radial movement of said closure member and said means against the inner wall.

6. A sealing means which may readily be affixed to or detached from a pressure vessel comprising; a radially expandable closure member adapted to be disposed within said vessel and having a substantially domelike surface contour directed towards the pressure side of the vessel, retaining means positioned within the vessel and engaging the peripheral edge of the closure member to prevent axial movement of said member, the peripheral edge of the closure member forming an acute angle with the wall of the vessel such that the peripheral edge is radially urged into sealing engagement with said retaining means by pressure acting upon the central domelike surface of the closure member to form a primary strong mechanical seal, a continuous strip of deformable material positioned in the apex of said angle to bear upon the pressure side of the closure member adjacent the periphery thereof so that pressure in the area adjacent the periphery of the closure member deforms the strip to wedge it into the juncture between the periphery of the closure member and the wall of the vessel to form a secondary deformable fluid tight seal.

7. A sealing means which may readily be affixed to or detached from a pressure vessel comprising; a resilient radially expandable closure member adapted to be positioned within the vessel and having a peripheral edge portion, supporting means within the vessel in continuous contact with the peripheral edge of the closure member to support said member in sealing position, means utilizing the pressure within the vessel to radially expand the peripheral edge into sealing engagement with said supporting means, and an auxiliary seal circumjacently located on the pressure side of said closure to seal the contacting portion of the closure, the sealing action of the auxiliary seal being independent of the radial movement of the closure member.

8. A sealing means which may be readily affixed to or detached from a pressure vessel having an annular groove formed therein comprising; a split-ring seated in said groove and having a shoulder formed on the inner periphery thereof, a radially expandable closure member mounted on said shoulder and having a substantially domelike surface contour directed towards the pressure side of the vessel, the peripheral edge of the closure member forming an acute angle with the wall of the vessel such that the peripheral edge is radially urged into sealing engagement at the juncture of the peripheral edge and the wall of the vessel by pressure acting upon the central domelike surface of the closure member to form a primary strong mechanical seal, an O-ring formed of deformable material, a plurality of ring retainers mounted on the closure member for normally supporting the ring in the apex of said angle to bear upon the pressure side of the closure member adjacent the periphery thereof so that pressure in the area adjacent the periphery of the closure member deforms the ring to wedge it into the juncture between the periphery of the closure member and the wall of the vessel to form a secondary deformable fluid tight seal.

References Cited in the file of this patent

UNITED STATES PATENTS

| | | |
|---|---|---|
| 1,207,937 | Kruse | Dec. 12, 1916 |
| 1,421,904 | Buehle | July 4, 1922 |
| 1,605,229 | Hartmann | Nov. 2, 1926 |
| 1,774,946 | Rankin | Sept. 2, 1930 |
| 1,903,168 | Cordrey | Mar. 28, 1933 |
| 2,420,184 | Mekelburg | May 6, 1947 |
| 2,451,599 | Wiltse | Oct. 19, 1948 |
| 2,463,516 | Buckhardt | Mar. 8, 1949 |
| 2,611,505 | Winborn, Jr., et al. | Sept. 23, 1952 |
| 2,613,845 | Swerdlow et al. | Oct. 14, 1952 |
| 2,657,807 | Launder | Nov. 3, 1953 |
| 2,665,818 | Borges et al. | Jan. 12, 1954 |